3,156,572
PRINTING INKS
Daniel J. Carlick, Berkeley Heights, and William J. Russell, Dover, N.J., assignors to Interchemical Corporation, New York, N.Y.
No Drawing. Filed Oct. 18, 1961, Ser. No. 145,979
5 Claims. (Cl. 106—27)

This invention relates to the art of typographic printing with thermoplastic inks. More particularly it relates to thermoplastic inks which are solids at room temperature and liquify at temperatures between 104° to 140° F.

Conventional typographic printing presently employs inks having the necessary fluidity and working consistency to be printed at ordinary press room temperatures. The ink printed on paper sets or drys either by oxidation, by polymerization of an oily component in the ink, by absorption of the ink into the paper, by the evaporation of solvents or by a combination of these methods. Conventionel typographic printing in newspapers is still hampered to some extent by smearing or marring of the undried ink which frequently occurs during passage of the printed matter onto impression rollers and the tendency of the partially dried inks to smear onto the hands of even the ultimate reader.

In addition, in order to produce high speed printed material on finer quality stock which does not cause drying by absorption, as does newspaper, it becomes necessary to set the ink with expensive moisture setting and heat setting apparatus.

In the past, many attempts have been made to develop an ink which would rapidly set upon being printed without the need of expensive drying or setting apparatus. Prominent among these attempts has been the development of various "hot melt" or "cold set" processes. These processes use an ink which is sold at pressroom temperatures but which, at relatively highly elevated temperatures in the range of 175° to 250° F., displays a fluid consistency suitable for printing. "Hot melt" printing normally conducted on presses in which the ink distribution system and rollers are heated to a temperature between 175° and 250° F. The ink, thus, has the desired molten consistency for working on the press. The sheet or web which is printed upon, being at ordinary pressroom temperature, extracts the heat from the ink deposited thereupon in thin films causing the print to set almost immediately by freezing. While hot melt printing has been successful to some degree, it has displayed certain manifest deficiencies which have prevented its wide acceptance in the printing art. These deficiencies have arisen as a direct result of the relatively high temperatures at which conventional "hot melt" printing must be conducted. It is known that as the press temperature rises, the paraffin wax used in "hot melt" ink and the solvents used therein display a greater tendency to react with the rubber rollers or the rubber coated rollers in the presses causing deterioration of these rollers. In addition, the rubber in these rollers itself tends to become soft and distorted while being worked at these high temperatures. The rubber also shows degradation at these temperatures. Secondly, the press operator is often required to set up his press and make adjustments therein at temperatures frequently near or above the boiling point of water. This exposes the operator to the constant danger of burns.

There have now been discovered novel inks which substantially overcome the disadvantages of "hot melt" inks while retaining the instantaneous drying properties of said inks. These new inks solidify or gel within the range of 104°–140° F. to provide a hard, solid, tack free and smudge free film which is comparable to that of conventional "hot melt" inks. Thus, these new inks may be printed at temperatures which do not present danger to the operator and do not expose the rubber in the press rollers to deteriorating conditions. In addition, the paraffin wax which is reactive with rubber rollers at "hot melt" temperatures is eliminated from the ink composition.

These novel inks may be produced by dispersing pigment in a vehicle comprising a low molecular weight crystalline polyamide such as the polyamide produced from a polymerized $C_{18}$ fat acid, particularly dimers and trimers of said fat acid e.g., dilinoleic and dilinolenic acid and ethylene diamine in accordance with U.S. Patent No. 2,379,413 and at least one alcohol solvent selected from the group consisting of dipropylene glycol, hexylene glycol, octylene glycol, neopentyl glycol, tridecyl alcohol, hexadecyl alcohol and lauryl alcohol.

The proportions of the poyamide and the solvent while not critical should be chosen to provide an advantageous ink. It is preferred that the ratio of polyamide to alcohol solvent vary between 6:4 and 4:6.

Without any commitment on the theory involved, it is believed that as the solidification or freezing point of the vehicle is reached, the vehicle crystallizes or gels. This crystallization or gelling is attributed to the hydrogen bonds of the polyamide. As heat is then applied, the hydrogen bonds break and the solid melts.

Existing "hot melt" printing presses may be used with the ink of this invention provided that the press is maintained between 104° and 140° F. Conventional printing presses may also be used provided that they are equipped with means for heating the ink distribution system to and means for maintaining the rollers at 104°–140° F.

Upon being deposited upon the web during printing, the ink, being exposed to pressroom temperatures of 75°–85° F., solidifies rapidly to provide an essentially hard, smudge proof and tack free printed film.

In the solid state, the inks have been found to give up quantities of solvent through syneresis. It is believed that such syneresis contributes to a certain extent to the hardening of the printed ink film.

In another embodiment of this invention, up to 50% of the solvent used may be replaced by an aliphatic hydrocarbon solvent having a boiling range between 474°–584° F. and aniline point between 171° and 177° F. It has been found that the hydrocarbon solvent tends to increase syneresis, thus increasing the rapidity of solidification of the printed ink film.

While the examples which follow only describe the use of Barium Red Lake C and Medium Chrome Yellow pigments, it will be understood that any conventional printing ink pigments may be used in preparing the inks of this invention and it is intended to cover the use of such pigments in the claims. The pigments may be dispersed in the vehicles by any of the conventional pigment dispersing methods.

The following examples illustrate preferred embodiments of this invention:

*Example 1*

Parts by weight
Polyamide produced by the condensations of dilinolenic acid and ethylene diamine in accordance with the procedure described in U.S. Patent No. 2,379,413, particularly the procedure of Example 1, thereof, having a softening point (ASTM E28–51T) of from 105° to 115° C. _____ 40
Dipropylene glycol _____ 30
Aliphatic hydrocarbon liquid petroleum distillate having a boiling point range of 474°–498° F., and an aniline point of 177° F. _____ 30

The above ingredients are mixed together and heated at 300° F. until the polyamide completely dissolves in the solvents.

20 parts by weight of Barium Red Lake C pigment is then dispersed in 80 parts of the resulting varnish. The dispersion may be most conveniently accomplished by the use of a steam heated three-roll mill. The resulting ink has a solidification point between 117°-120° F.

The ink distributing system and plate assembly of a Vandercook Proof Press No. 4 is heated to 125° F. Using the above ink, prints are made on clay coated board. The room temperature during printing is 75° to 80° F. The print is examined immediately after impression and found to be hard, solid, smudge proof and tack free.

*Example 2*

Example 1 is repeated with the proportion of the ingredients varied as follows:

| | Parts by weight |
|---|---|
| Polyamide | 60 |
| Dipropylene glycol | 20 |
| Aliphatic hydrocarbon | 20 |

20 parts by weight of Barium Red Lake C is dispersed in 80 parts of the resulting varnish. The produced ink has a solidification point between 140° F.–142° F. which is at the upper limit of the range of desirable solidification points of the inks of this invention. However, this ink produced print which is harder than the print of Example 1.

*Example 3*

| | Parts by weight |
|---|---|
| Polyamide produced by the condensation of dilinolenic acid and ethylene diamine in accordance with the procedure described in U.S. Patent No. 2,379,413, particularly the procedure of Example 1 thereof | 40 |
| Dipropylene glycol | 40 |
| Octylene glycol | 20 |

The polyamide is dissolved in the glycol solvents in accordance with the procedure outlined in Example 1. Then, following the procedure of said example, an ink is formulated of 20 parts by weight of Barium Red Lake C and 80 parts of varnish. The resulting ink has solidification point of 117° F. Prints made as outlined in Example 1 were comparable in all properties to the prints of said example except that the ink of the present example has a slightly greater press stability but does not harden as rapidly as the ink in Example 1.

*Example 4*

Example 1 is repeated with an aliphatic hydrocarbon having a higher boiling point range of 548°-584° F. and an aniline point of 171° F. used in place of the hydrocarbon used in said example. The resulting ink has a solidification point of 122°-124° F. The ink did not display flow properties equivalent to those of the ink of Example 1. However, it was comparable to said ink in all other properties.

*Examples 5–8*

Following the procedure set forth in Example 1, varnishes having the following formulations are prepared:

*Example 5*

| | Parts by weight |
|---|---|
| Polyamide produced by the condensation of dilinolenic acid and ethylene diamine in accordance with the procedure described in U.S. Patent No. 2,379,413, particularly the procedure of Example 1 thereof | 50.0 |
| Triethylene glycol | 12.5 |
| Octylene glycol | 12.5 |
| Aliphatic hydrocarbon liquid petroleum distillate having a boiling point range of 474°-498° F, and an aniline point of 177° F. | 25.0 |

*Example 6*

| | Parts by weight |
|---|---|
| Polyamide of Example 5 | 50.0 |
| Triethylene glycol | 15.0 |
| Octylene glycol | 15.0 |
| Aliphatic hydrocarbon of Example 5 | 20.0 |

*Example 7*

| | Parts by weight |
|---|---|
| Polyamide of Example 5 | 50.0 |
| Triethylene glycol | 10.0 |
| Octylene glycol | 10.0 |
| Aliphatic hydrocarbon of Example 5 | 30.0 |

*Example 8*

| | Parts by weight |
|---|---|
| Polyamide of Example 5 | 50.0 |
| Triethylene glycol | 25.0 |
| Octylene glycol | 25.0 |

Inks having desirable melting points and other properties suitable for the practice of this invention may be prepared by adding Barium Red Lake C pigment to the varnishes of Examples 5–8 in accordance with the procedure outline in Example 1. Inks prepared from the varnishes of Examples 5–8 have the following melting points.

| | Melting point, ° F. |
|---|---|
| Example 5 | 132.8–134.6 |
| Example 6 | 132.8–134.5 |
| Example 7 | 140–142.6 |
| Example 8 | 137.4–141.8 |

*Example 9*

| | Parts by weight |
|---|---|
| Polyamide used in Example 1 | 40 |
| Dipropylene glycol | 30 |
| Aliphatic hydrocarbon liquid petroleum distillate having a boiling range of 548°-584° F. and an aniline point of 171° F. | 25 |
| Aliphatic hydrocarbon liquid petroleum distillate having a boiling range of 495°-540° F. and an aniline of 18° F. | 5 |

A varnish is prepared from the above ingredients in accordance with the procedure described in Example 1. An ink is prepared in accordance with the procedure of Example 1 comprising 80 parts by weight of the prepared varnish and 20 of Barium Red Lake C. A second ink is prepared by combining 45 parts of the varnish with 55 parts of medium chrome yellow in accordance with the same procedure. The resulting inks are more press stable than the inks of Example 1 and are equivalent to said links in all other properties.

*Example 10*

| | Parts by weight |
|---|---|
| Polyamide produced by the condensation of dilinolenic acid and ethylene diamine in accordance with the procedure described in U.S. Patent No. 2,379,413, particularly the procedure of Example 1 thereof | 30 |
| Hexylene glycol | 20 |

A varnish is prepared from the above ingredients in accordance with the procedure of Example 1. When this varnish has a pigment dispersed therein in accordance with the procedure of Example 1, a printing ink is provided which has less press stability than the ink of Example 1 but is equivalent thereto in all other properties. The ink has a melting point of 116.5° F.

*Example 11*

| | Parts by weight |
|---|---|
| Polyamide of Example 10 | 20 |
| Hexadecyl alcohol | 30 |

Example 10 is repeated using the above ingredients. An ink is produced which has a melting point of 104°

F. and which is comparable to the ink of Example 1 in all properties.

*Example 12*

| | Parts by weight |
|---|---|
| Polyamide of Example 10 | 30 |
| Neopentyl glycol | 20 |
| Octylene glycol | 5 |

Example 10 is repeated using the above ingredients. Inks prepared from this varnish provide satisfactory thermoplastic inks having a melting point of 111° F.

*Example 13*

| | Parts by weight |
|---|---|
| Polyamide of Example 10 | 25 |
| Lauryl alcohol | 12.5 |
| Aliphatic hydrocarbon having a boiling range of 548°–584° F. and an aniline point of 171° F. | 12.5 |

Example 10 is repeated using the above ingredients. Inks prepared from this varnish provide thermoplastic inks having a melting point of 131° F.

While there have been described what are, at present, considered to be the preferred embodiments of this invention, it will be obvious to those skilled in the art that various changes and modifications may be made therein without departing from the invention, and it is, therefore, intended to cover all such changes and modifications as fall within the true spirit and scope of the invention.

What is claimed is:

1. A thermoplastic printing ink having a solidification point between 104° and 140° F. comprising pigment dispersed in a vehicle consisting essentially of a polyamide produced by the condensation of a polymerized acid selected from the group consisting of dimers and trimers of linoleic acid and linolenic acid and ethylene diamine and at least one solvent selected from the group consisting of dipropylene glycol, hexylene glycol, octylene glycol, neopentyl glycol, tridecyl alcohol, hexadecyl alcohol and lauryl alcohol.

2. The thermoplastic ink claimed in claim 1 wherein said solvent further includes an aliphatic hydrocarbon petroleum distillate having a boiling range between 474° and 584° F. and an aniline point between 171° and 177° F.

3. A thermoplastic ink according to claim 1 wherein said solvent includes diproylene glycol and octylene glycol.

4. A thermoplastic ink according to claim 2 wherein said solvent includes dipropylene glycol, octylene glycol and an aliphatic hydrocarbon petroleum distillate having a boiling range between 474°–498° F. and an aniline point of 177° F.

5. The ink of claim 1 wherein said polymerized acid is dilinolenic acid.

References Cited in the file of this patent

UNITED STATES PATENTS

| 2,379,413 | Bradley | July 3, 1945 |
| 2,598,332 | Walton | May 27, 1952 |
| 2,768,090 | Witcoff et al. | Oct. 23, 1956 |
| 2,788,287 | Zweig | Apr. 9, 1957 |
| 2,996,396 | Schroeder et al. | Aug. 15, 1961 |
| 3,017,374 | Bernardi et al. | Jan. 16, 1962 |
| 3,028,349 | Rowland et al. | Apr. 3, 1962 |
| 3,037,871 | Floyd | June 5, 1962 |

OTHER REFERENCES

Ellis: Printing Inks, Reinhold Publishing Corporation, New York, 1940, TP 949 E47 (p. 64, "Tung Oil,"' relied on).